INVENTORS
Erik Göran Lenneryd
Karl Reider Trumstedt
BY [signature]
ATTORNEY

Sept. 28, 1971  E. G. LENNERYD ET AL  3,608,212
BATTLEFIELD CONDITIONS SIMULATOR FOR ARTILLERY
FIRE CONTROLLER TRAINEES
Filed Dec. 1, 1969

INVENTORS
*Erik Göran Lenneryd*
*Karl Reidar Trumstedt*
BY
ATTORNEY

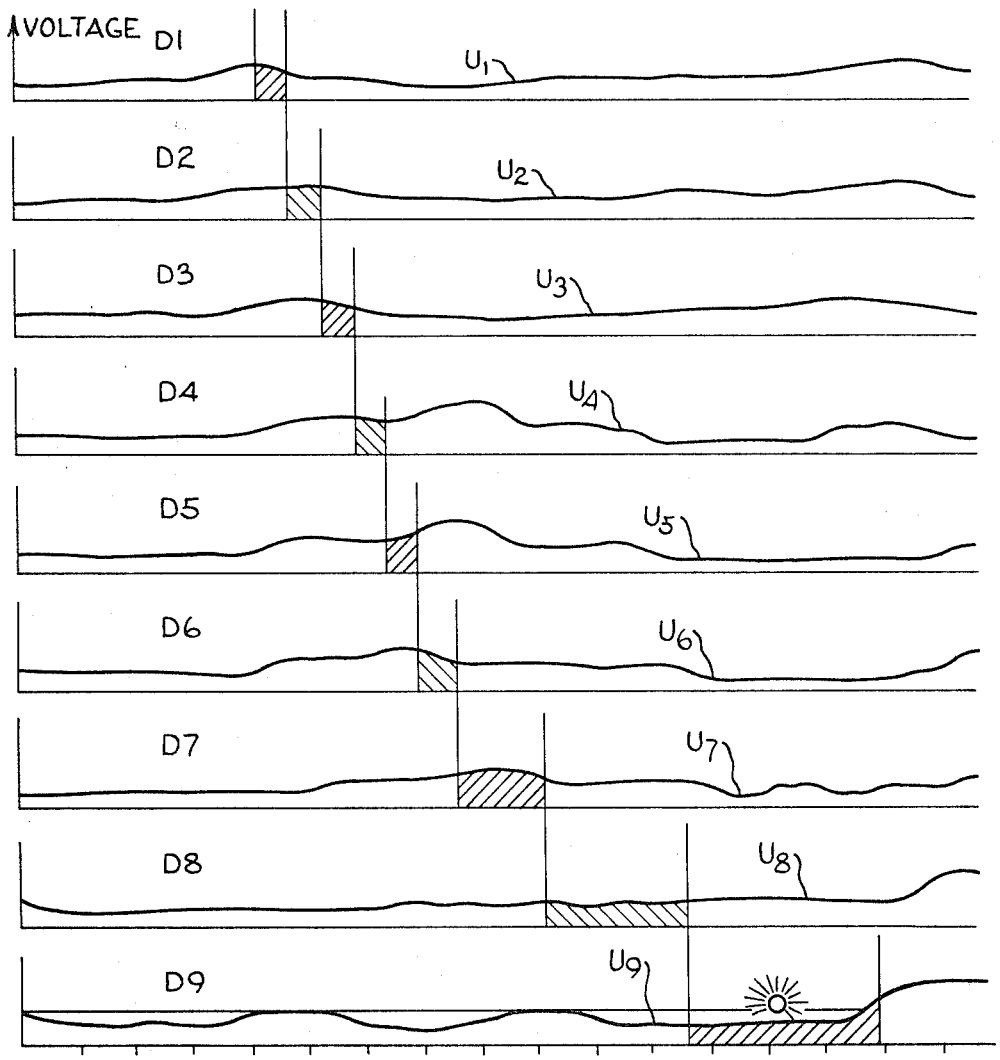
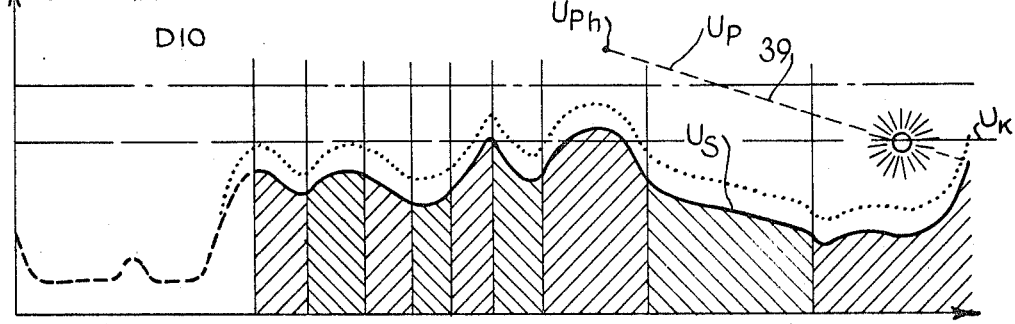
FIG. 6.

United States Patent Office 3,608,212
Patented Sept. 28, 1971

3,608,212
BATTLEFIELD CONDITIONS SIMULATOR FOR ARTILLERY FIRE CONTROLLER TRAINEES
Erik Goran Lenneryd, Bromma, and Karl Reidar Trumstedt, Taby, Sweden, assignors to Saab-Scania Aktiebolag, Linkoping, Sweden
Filed Dec. 1, 1969, Ser. No. 881,219
Claims priority, application Sweden, Dec. 3, 1968, 16,367/68
Int. Cl. F41g 3/26
U.S. Cl. 35—25          6 Claims

ABSTRACT OF THE DISCLOSURE

On a battlefield panorama, images of artillery projectile explosions are projected at the locations they would attain if fired from a gun laid according to fire controller's orders, and of appearance that takes account of any intervening elevations in the depicted terrain. Location of each explosion is computed by comparing terrain elevation signals from a three-dimensional memory unit, taken along the track of the assumed projectile, with a signal corresponding to changing altitude of the projectile in the final portion of its trajector; and the explosion image projector is swung to the location and elevation thus determined. Selection of an appropriate image is made in response to comparison of an explosion elevation signal with signals for elevations of the depicted terrain between the burst point and the fire controller's post.

---

This invention relates to apparatus for training fire controllers who direct the fire of artillery pieces in accordance with their observations of the effects of the weapons they direct; and the invention is more specifically concerned with means for realistically simulating the effects of fire from an emplaced long range weapon, so that trainees can acquire skill in artillery fire control under conditions that closely reproduce those of a battlefield.

In many tactical situations in which relatively long range weapons are used, the personnel who aim and fire such weapons are unable to see the target at which they are firing, and they must therefore rely upon information relayed to them by a fire controller or artillery spotter who is posted at some distance from the gun emplacement and who is able to command a view of the target area. For each round to be fired the fire controller gives instructions for aiming the piece, based on his observation of the effects of the preceding round, and thus, by a trial-and-error method of bracketing and successive approximations, he so directs the aiming of the piece as to cause it to achieve a hit on the target as quickly as possible.

Although the distance and direction of the controller's post from the gun emplacement can be accurately known from measurements, the position of the target relative to his post and to the gun position are usually known only approximately, and proper aiming of the gun is thus largely dependent upon the fire controller's skill in judging distances and directions and their relationship to the elements of aim. Such skill can be developed only through training and experience.

Heretofore fire controllers have been trained mainly in field exercises using actual artillery pieces. Such training was obviously expensive, and it was dangerous both to persons who might inadvertently enter the target area and to the fire controller trainees, whose posts were usually forward of the gun emplacement.

While simulators for the training of fire controllers have heretofore been proposed, prior apparatus for this purpose has been difficult to operate and has had relatively small training value because it lacked realism, particularly in that it did not simulate explosions in a target area in such a manner that the fire controller trainee could make correct observations from which he could insure appropriate aiming commands that would bring the fire of a simulated weapon to bear upon a selected target.

By contrast, it is a general object of the present invention to provide a training device for artillery fire controllers that very realistically simulates battlefield conditions, and wherein the fire controller trainee sees a battlefield panorama before him upon which shots appear to be placed in accordance with his gun aiming commands, the effects of each round being simulated with great fidelity.

Certain types of projectiles fired from artillery pieces are adapted to burst upon ground impact, while others are adapted to explode in the air. The latter may be provided with a time device which effects detonation after a predetermined interval following firing, or may be equipped with a proximity fuse which effects detonation when the trajectory of the projectile brings it to within a predetermined distance from the ground.

The explosion of a ground-impact-detonated projectile differs in appearance from that of an air detonated projectile. Furthermore, if an air burst occurs within a certain distance from the ground, it gives rise to a characteristic scrap impact on the ground beneath the explosion, which impact is visible to the fire controller if it is not concealed by intervening terrain features. If the explosion of a projectile occurs behind a partially concealing terrain feature, such as a hill, the fire controller may not see the explosion itself, but he may be able to see a smoke cloud rising above the obstruction. Thus the appearance of an explosion depends upon both the nature of the projectile and the character of the intervening terrain, and since the visible features of the explosion give the fire controller useful information about the placement of the round in relation to the target, it is very important that practical training apparatus for fire controllers be capable of simulating them accurately.

It is thus another and very important feature of this invention to provide a simulator of the character described, for the training of artillery fire controllers, whereby the effects of both air bursts and ground impact explosions are very faithfully reproduced, including the effects of explosions partially concealed from the trainee by intervening terrain features.

With these observations and objectives in mind, the manner in which the invention achieves its purpose will be appreciated from the following description and the accompanying drawings, which exemplify the invention, it being understood that such changes in the precise method of practicing the invention and in the specific apparatus disclosed herein may be made as come within the scope of the appended claims.

The accompanying drawings illustrate two complete examples of the embodiments of the invention constructed according to the best modes so far devised for the practical application of the principles thereof, and in which:

FIG. 6 is a diagram showing the relationship of signals representing ground contours along each sector and along the track of a fictitious projectile.

Figure 1:
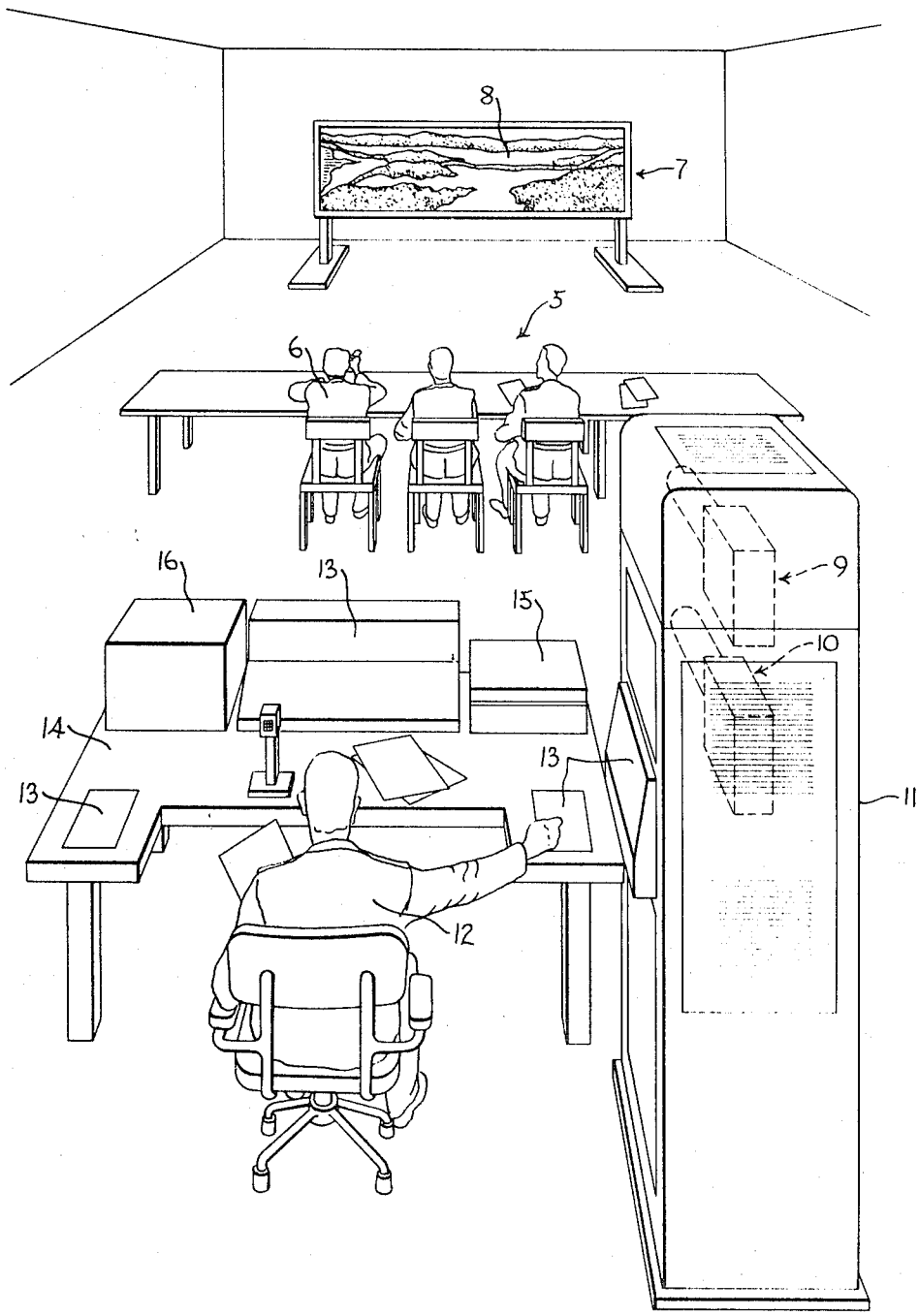
FIG. 1 is a general perspective view of apparatus embodying the principles of this invention, shown in use in the training of artillery fire controllers.
Figure 2:
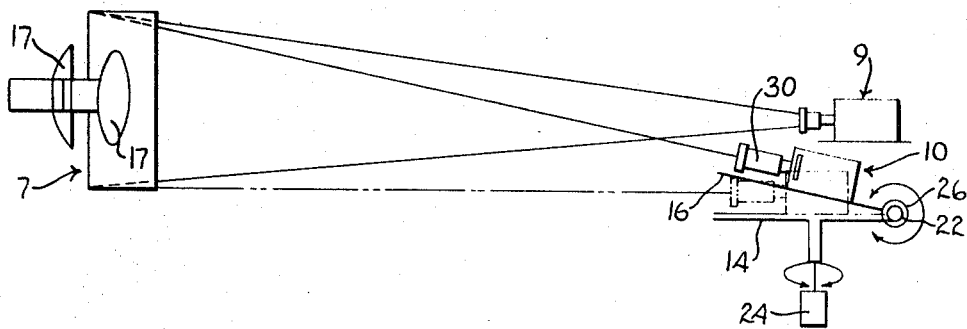
FIG. 2 is a diagrammatic side view of the projectors of the training apparatus.
Figure 3:
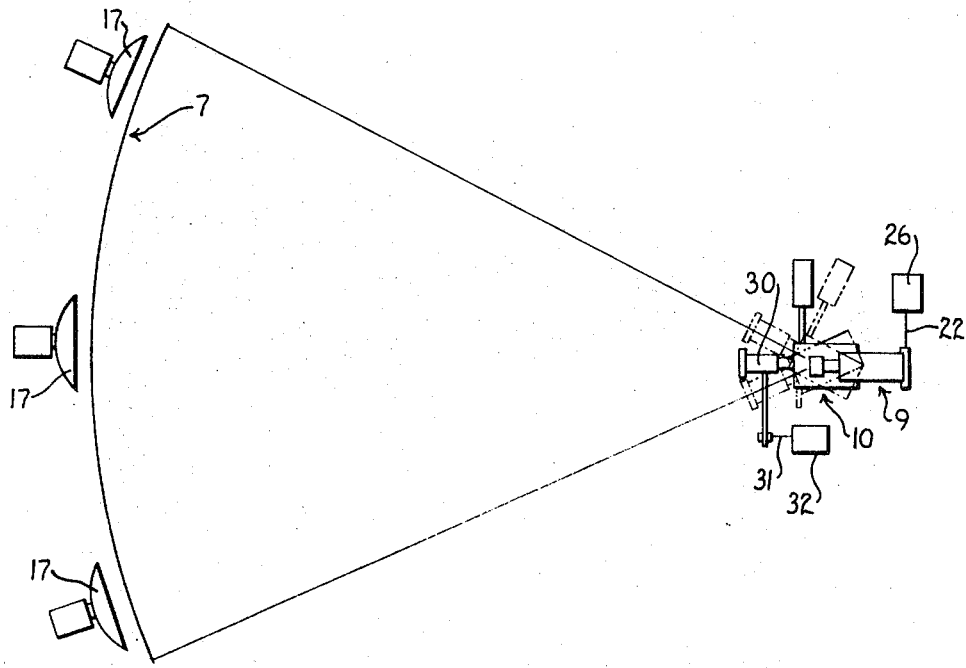
FIG. 3 is a diagrammatic top view of the projectors.

Referring now to the accompanying drawings, FIG. 1 depicts a training situation in which the apparatus of this invention is in use for training three artillery fire controller trainees 5, two of whom are observers and one of whom, designated by 6, has been selected as the fire controller and is receiving active training. On a screen 7 before the trainees there is depicted a panorama 8 of a battlefield as it would be seen from a fire controller's post. The panorama can be painted or otherwise permanently delineated on the screen, but it is preferably projected onto it by means of a projector 9, which can be a still picture projector but which could also be a motion picture projector (particularly if moving targets are to be depicted), and which can also be adapted, if desired, to project stereoscopic pictures in a known manner.

A target can be symbolized or depicted on the panorama in any suitable manner, as by incorporating a symbol or representation of a target in the panorama picture projected by the projector 9, or by means of a separate still or motion picture projector (not shown).

To simulate each round fired at the target, a burst image projector 10 projects on the panorama picture 8 a luminous image which has a position on the picture that accurately corresponds to the results that would be obtained with real artillery aimed in accordance with orders issued by the fire controller trainee, and which image looks like an explosion of the type of projectile assumed to be fired, as such explosion would appear from the fire controller's post, taking account of the terrain between that post and the explosion site.

The panorama projector 9 and the burst image projector 10 are housed in a suitable cabinet 11 that protects them from dirt and injury.

The apparatus is controlled and operated by an instructor 12, who makes adjustments to it in accordance with aiming commands issued to him by the fire controller trainee 6 and who also makes settings for the type of projectile assumed to be in use. For these the instructor has within his reach a number of control panels 13 that are mounted on the projector cabinet 11 and on a table 14 in front of him. Also located on the table 14 are a memory unit 15 and comparator means 16, comprising parts of an automatic control for the burst image projector 10.

To further increase the realism of training exercises conducted with the use of the apparatus, speakers 17 are located behind the screen for producing the noise of explosions at appropriate times, preferably stereophonically.

In using the apparatus, the trainee 6 issues orders on the basis of his estimate of the elements of aim required to hit a target designated on the panorama picture, and the instructor makes adjustments to the apparatus that correspond to the aiming of an artillery piece in accordance with the orders issued by the trainee. On the basis of such adjustments, the projector 10 automatically projects an appropriate explosion image at the location on the picture corresponding to the point at which an actual projectile would have exploded had it been fired from a piece aimed in accordance with the trainee's instructions. The appearance of the explosion image is followed, after an appropriate interval, by the sound of a detonation, issuing from the speakers 17.

To provide for projecting the explosion image at the proper location on the panorama, the burst image projector 10 is gimbal mounted on a yoke 19 that carries a cradle 20. The yoke has an upright stem portion 21 about which it swings to provide for azimuth adjustments of the projector 10. The cradle 20, which directly supports the projector, is journaled upon the yoke on a horizontally extending shaft 22 and can thus be swung up and down to carry the projector 10 in elevation adjustments.

Figure 4:
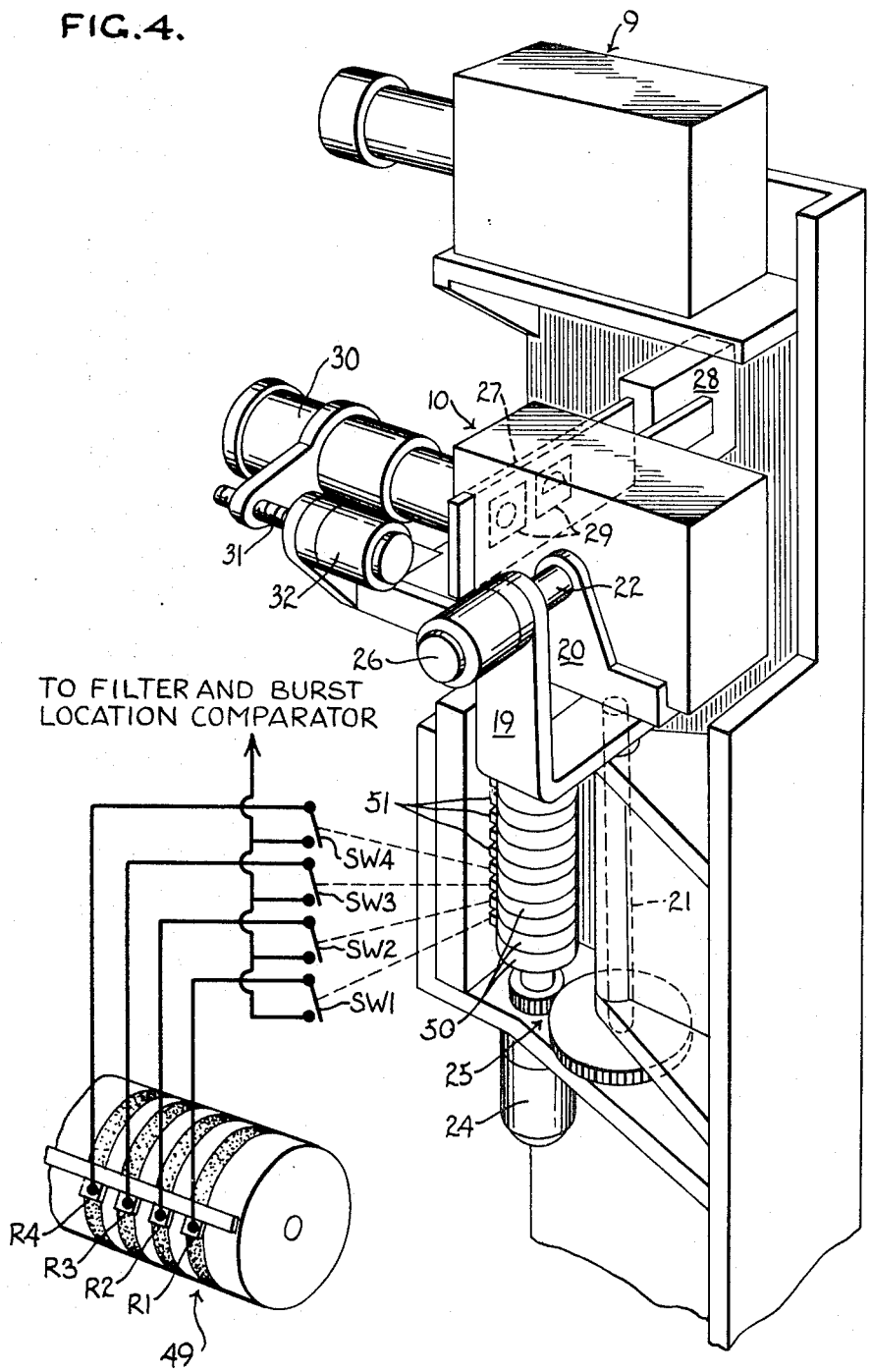
FIG. 4 is a side perspective view of the projectors of the apparatus, with portions broken away to show details, and with certain associated apparatus that is characteristic of one embodiment of the invention shown diagrammatically.

Azimuth adjustments of the burst image projector are effected by means of a motor 24 acting through spur gearing 25 (see FIG. 4) connected with the stem portion 21 of the yoke. The projector 10 is moved in its elevation adjustments by means of a motor 26, mounted on the yoke 19, which rotates the horizontally extending shaft 22 to which the cradle 20 is secured.

As an obvious alternative to movable mounting of the burst image projector, the projector could be fixed and could project into a gimbal mounted mirror, which would in turn reflect the image onto the screen 7. In that case the mounting and actuating means for the mirror would be generally like those just described for the projector 10.

It will appear as the description proceeds that the adjustment of the projector 10, both laterally and in elevation, is effected automatically by the control apparatus hereinafter described.

In order to produce an explosion image appropriate to the type of ammunition assumed to be in use and to terrain conditions, the explosion image projector 10 has a slide holder 27 that holds a number of different slides 29, one for each of the different possible explosion images, which slides can be prepared from photographs of real explosions. The several slides depict, for example, an air burst without ground scrap effect, an air burst with ground scrap effect, a ground impact explosion, a partially concealed explosion of which only smoke is visible, etc. An automatic slide changing mechanism 28 actuates the slide holder to bring any selected one of the slides into position for projection.

To vary the size of the burst image on the screen 7 in accordance with the supposed distance of the explosion from the trainee, the projector 10 is equipped with a zoom lens 30 that is actuated through a screw mechanism 31 by a motor 32 and is adjusted automatically as explained hereinafter.

Instead of the zoom lens arrangement, a number of slides could be stored in the slideholder, having images of different sizes corresponding to explosions at different distances. In that case, there would have to be a fairly large number of slides, to provide such graduation of sizes as would achieve realistic effects, and the slide holder could suitably be in the form of a rotatable disc having the slides arranged around its circumference.

Where a zoom lens is used, the control mechanism for it, which positions it in accordance with the calculated distance between the firing controller and the assumed point of projectile explosion, can be coordinated with means for interposing an appropriate interval of delay between projection of a burst image and production of a simulated detonation noise from the speakers 17, and with means for controlling the volume of the explosion noise in accordance with that assumed distance. This not only enhances the realism of the training but also enables the trainee to acquire skill in supplementing his visual observations with auditory clues.

Figure 5:
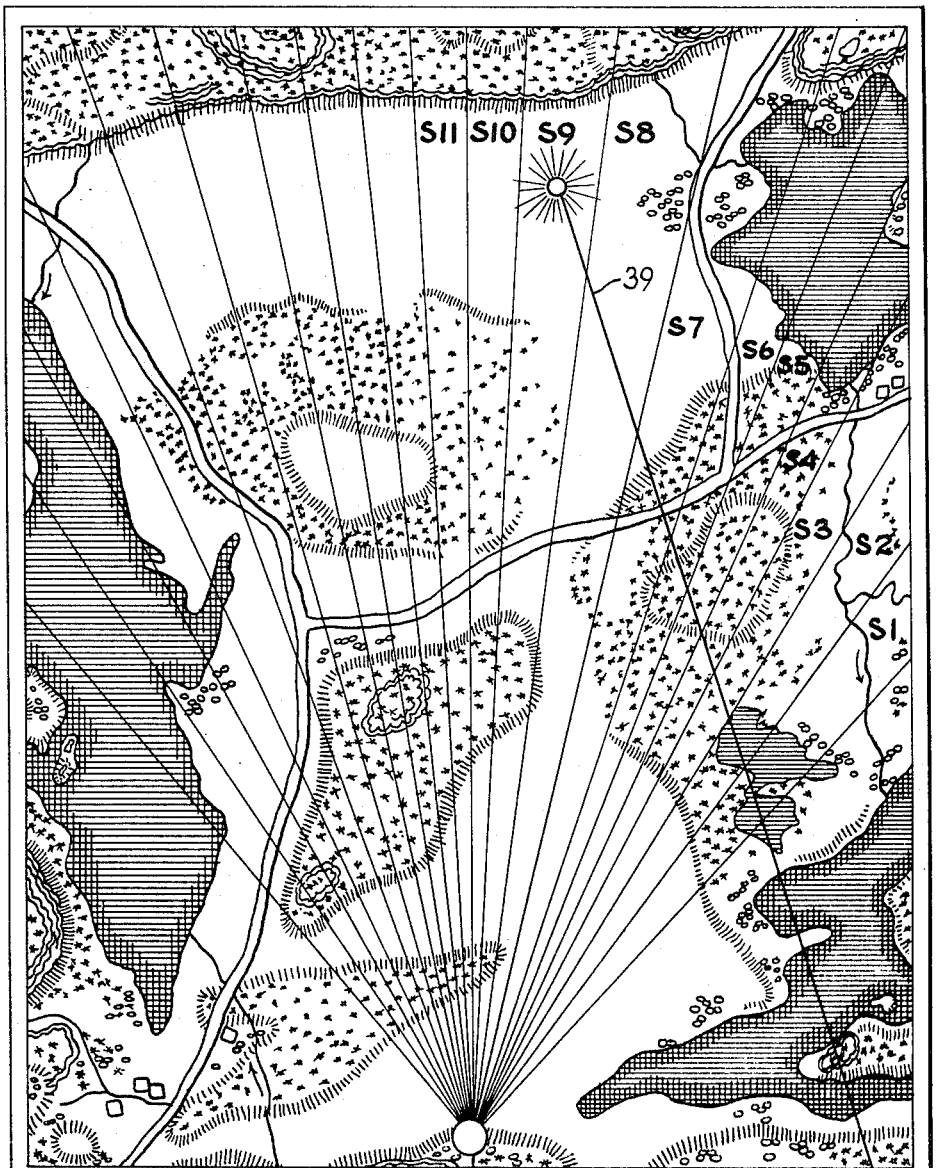
FIG. 5 is a map of the terrain depicted on the screen in FIG. 1, showing how the terrain is divided into sectors radiating fan-like from the fire controller's assumed observation post.

In order to obtain the necessary fidelity of the burst images displayed with the simultator of this invention, the actual or assumed relief features of the terrain depicted in the panorama 8 must be accurately known, and information concerning such terrain elevations must be stored in the memory unit 15. FIG. 5 represents the terrain depicted in the panorama 8, in the form of a map such as can be used in preparing the apparatus of this invention for use.

The fire controller's post is assumed to be at the position designated by the point 33 in FIG. 5, which point corresponds to the bottom center of the panorama 8. With reference to FIG. 5, the depicted terrain is divided into wedge-shaped sectors S1, S2, S3 . . . etc. by lines radiating fanwise from the point 33. The lines defining the sectors are not spaced apart at geometrically equal intervals, but preferably extend as nearly as possible along portions of the mapped terrain where there are marked variations in elevation, as along the edge of a woods, along an escarpment, and the like. Hence variations in terrain elevation across each sector will be relatively small, although there may be substantial variations in terrain elevation lengthwise along a sector.

The location on the represented terrain at which an assumed projectile will burst is determined both by the trajectory of the projectile and by terrain elevations in the neighborhood of the final portion of its trajectory. For purposes of simplification, the final portion of the assumed trajectory of each projectile, in which it moves across the depicted terrain, can be taken to be a straight line.

In order to calculate the point at which the trajectory of an assumed projectile intersects the ground (ground burst point), the apparatus produces one signal which has a magnitude (e.g., voltage) that corresponds to the decreasing altitude of the projectile through the final portion of its trajectory, and another signal, derived from the memory unit 15, which corresponds to terrain elevations along the track of the assumed projectile; and these signals are fed to the comparator means 16, which determines the point at which they are equal. The apparatus so controls the movements of the burst image projector 10 as to cause the image of an explosion to be projected onto the panorama at the location thereon that corresponds to the equal signal point.

As shown, the memory unit 15 comprises a three-dimensional cam 35 upon which the ground elevations are represented and which can be regarded as, in effect, a plurality of axially adjacent cam elements, each corresponding to one of the sectors S1, S2 . . . etc., and all mounted on a common shaft for rotation therewith. Each cam element is so profiled that the radial distances from its axis to its periphery correspond to ground elevations along the sector which it represents. It will be evident that the point 33 is represented on the cam 35 by a line along its surface that is defined by a plane lying on its axis. It will also be evident that the cam 35 represents only one possible form of memory unit for storage of data concerning terrain elevations.

The cam 35 cooperates with a feeler-like sensor or cam follower 36 which is mounted on a carrier 37 that is constrained to back and forth motion along a defined path parallel to the shaft of the cam. The sensor is swingable relative to the carrier in accordance with lift imparted to the sensor by the cam 35. The sensor 36 can serve as the actuator for a variable resistor 38 whereby the voltage output of an electrical circuit in which the variable resistor is connected changes in correspondence with lift imparted to the sensor by the cam and hence corresponds at any instant to the terrain elevation at the point in the panorama that is represented by the point on the cam at which the sensor engages it.

When the imaginary gun is aimed in any particular azimuth direction, the projectile fired from it can be assumed to make a track across the depicted terrain that will traverse one or more of the sectors S1, S2 . . . etc., the line 39 in FIG. 5 being representative of one such track. FIG. 6 represents, in diagrams D1 through D9, the variations in terrain elevation lengthwise along each of sectors S1 through S9 respectively, and the shaded portion of each of said diagrams represents the portion of the respective sector that is crossed by the projectile track 39 in FIG. 5. It will be apparent that each of the curves $U_1$, $U_2$, $U_3$ . . . etc. in the diagrams D1, D2, D3 . . . etc., respectively, represents not only the terrain elevations along its corresponding sector but also the voltage output of the variable resistor circuit that would be obtained if the cam 35 were rotated without axial movement of the carrier 37 and with the sensor 36 engaging that axial segment of the cam which corresponds to the particular sector.

The track of the projectile across each sector can be regarded as having two vectorial components, one transverse to the sector and one lengthwise of it. The component lengthwise of the sector is of course mechanized in rotation of the cam 35, while the transverse component is mechanized in motion of the carrier 37 parallel to the cam axis. The cam 35 is rotated by means of a reversible motor 41. The carrier 37 is actuated by a motor 42 which turns a lead screw 43 that has a threaded driving connection with the carrier. The energizing inputs to motors 41 and 42 can be generated by a computerized projectile track signal generator which governs their respective rotational speeds in accordance with a manually adjusted azimuth setting that simulates lateral aiming of the imaginary gun.

It will be seen that for the projectile track 39 in FIG. 6, the output of the circuit comprising the variable resistor 38 is a signal having a voltage that varies with variations in terrain elevation along the track of the projectile, which signal is represented by the curve $U_s$ in diagram D10 of FIG. 6.

This terrain elevation signal is continuously fed into a burst location comparator. Also fed into the burst location comparator is a projectile altitude signal $U_p$ of steadily decreasing voltage, which represents the decreasing altitude of the projectile in the final portion of its trajectory. The projectile altitude signal $U_p$ is produced by a trajectory signal generator or transducer which can be adjusted by manual control instrumentalities with respect to the initial value $U_{ph}$ of the signal $U_p$ (corresponding to the altitude of the projectile as it enters the plane of the screen 7), the rate at which the voltage $U_p$ decreases, and the time at which it begins relative to the rotational position of the cam 35, all of which adjustments correspond to elements of aim of the imaginary gun such as its elevation angle, the propellant charge being used and the supposed ballistic characteristics of the projectile. It will also be appreciated that consistent real time and distance units must be used for the decline of the voltage of signal $U_p$, the rotation of the cam 35 and the axial movement of the sensor-carrying block 37.

At some point the $U_s$ and $U_p$ signals fed into the burst location comparator will be equal, signifying that the imaginary projectile has reached ground elevation; and when this happens the burst location comparator issues a signal that stops rotation of the cam drive motor 41 and of the motor 42 that drives the sensor carrier 37.

The point along its path at which the sensor carrier stops corresponds to the azimuth position that the burst image projector 10 should have, and hence the position of the carrier can be utilized to issue a demand value signal for lateral aiming of the projector 10. For this purpose, as illustrated, a contactor or finger 45, which is mounted on the carrier and is thus constrained to move back and forth with it, cooperates with a resistance strip 46 that is fixed adjacent to the path of the carrier 37 and extends lengthwise thereof. The resistance strip is connected in a demand value circuit to produce a demand value signal in accordance with the position of the carrier 37. The azimuth actuating mechanism for the projector 10, comprising the motor 24, is governed by a servo control mechanism of known type whereby a true value signal is generated as the projector is swung in azimuth, which true value signal corresponds at each instant with the azimuth position of the projector, and this true value signal and the demand value signal are both fed to a projector azimuth comparator comprising a part of the comparator means 16. By means of this comparator the true value signal is compared with the demand value signal, and the projector is swung to bring the true value signal into equality with the demand value signal.

At the instant when the voltage of the terrain elevation signal $U_s$ equals that of the projectile altitude signal $U_p$, that voltage corresponds to the position in elevation that the projector 10 should have. The signal from the trajectory signal generator can therefore be maintained constant at the voltage value reached at that instant and can be used as a demand value signal for the control of the projector elevation servo, comprising the motor 26. Hence the equality signal issued by the burst location comparator can be fed to the trajectory signal generator to prevent further decrease of the voltage put out by that generator.

If the projectile is assumed to be equipped with a timed burst control, whereby it is caused to explode after a certain interval following its discharge from the gun, a manual control can be set to simulate the assumed time interval, thereby adjusting a time burst control signal generator which incorporates a suitable time delay mechanism. The time burst control signal generator issues a constant voltage signal $U_k$ to burst location comparator and compares with $U_p$. If the signal $U_p$ and the signal $U_k$ are equal the burst location comparator issues a stop impulse signal to the drive motors 41 and 42 and to the trajectory signal generator. The burst location comparator issues signals to the slide selector for selecting appropriate slides.

If the projectile is assumed to be equipped with a proximity fuse, a manually controllable proximity fuse instrumentality is adjusted to the altitude at which the proximity fuse is assumed to be effective, and that instrumentality issues a constant voltage signal $U_f$ which is superimposed upon (added to) the terrain elevation signal $U_s$ that is being fed to the burst location compartor, so that said comparator will produce its equality signal at a correspondingly higher value of the signal $U_p$ from the trajectory signal generator.

Having thus in effect determined the position in azimuth and elevation of the explosion of the assumed projectile, the apparatus now proceeds to select the burst image slide that is appropriate to the terrain that lies between the burst point and the point 33 that corresponds to the fire controller's post. For this purpose the motor 41 that rotates the cam 35 is energized to turn in the reverse of its immediately previous direction, while the sensor carrier 37 remains stopped. Hence the cam segment that is engaged by the sensor during this retrograde rotation will correspond to the sector in which the explosion occurs, and the output of the signal circuit that comprises the sensor-actuated variable resistor 38 will correspond to terrain elevations along the length of that sector between the burst point and the point 33 that represents the fire controller's post. A burst image form comparator, also comprising a part of the comparator means 16, receives these terrain elevation signals and also receives the constant voltage burst elevation signal from the trajectory signal generator.

If the value of the sector terrain elevation signal fed to the burst image form comparator does not exceed that of the burst elevation siginal at any time during the retrograde rotation of the cam, this of course signifies that no intervening terrain feature will conceal any part of the explosion from the fire controller, and the burst image form comparator issues an appropriate signal to the slide changing mechanism 28 by which a slide is positioned for projection that contains the full image of an explosion.

If, on the other hand, the value of the sector terrain elevation signal at some point exceeds that of the burst elevation signal, this signifies that an intervening terrain feature will partially or completely conceal from the fire controller the visible effects of the explosion, and the burst image form comparator issues a corresponding signal to the slide changer 28 by which a slide is moved into projection position that provides the appropriate image of a partially concealed explosion.

It will be understood that before the apparatus makes this final selection of the particular slide to be projected, a preliminary selection of one group of all of the available slides has been made, on the basis of whether the projectile is assumed to be equipped for an air burst or for ground impact detonation. The means for effecting this preliminary selection is of course tied in with manual adjustment instrumentalities that set up the apparatus for the desired type of detonation.

As an alternative to storing terrain elevation information on cam means, as above described, such information can be stored on magnetic tape, preferably in the form of a closed loop of tape 49 on which there is a multichannel recording of modulated signals, each channel corresponding to one of the sectors S1, S2 . . . etc. (see FIG. 4). As the tape moves orbitally, it is drawn past multiple reproducing heads, R1, R2, R3 . . . etc., one for each channel. The output from each reproducing head in turn is fed to the burst location comparator, through a demodulating filter. Each reproducing head is thus connected with the burst location comparator during the interval that the projectile is assumed to be traversing the sector to which it corresponds.

Selection of the proper reproducing head can be effected by utilizing azimuth adjusting motion of the burst image projector 10, which is caused to swing in such a manner that, in effect, it tracks on the imaginary projectile in its flight across the several sectors. To this end a plurality of axially adjacent cams 50, one for each sector, can be mounted on a shaft that rotates in synchronism with the stem portion 21 of the yoke 19 as the projector 10 swings in its azimuth motion. Each cam 50 cooperates with a cam follower 51 that actuates a switch SW1, SW2, SW3 . . . etc. There is of course one such switch for each reproducing head, and when each switch is closed its reproducing head is connected with the filter and the burst image location comparator.

Figure 7:
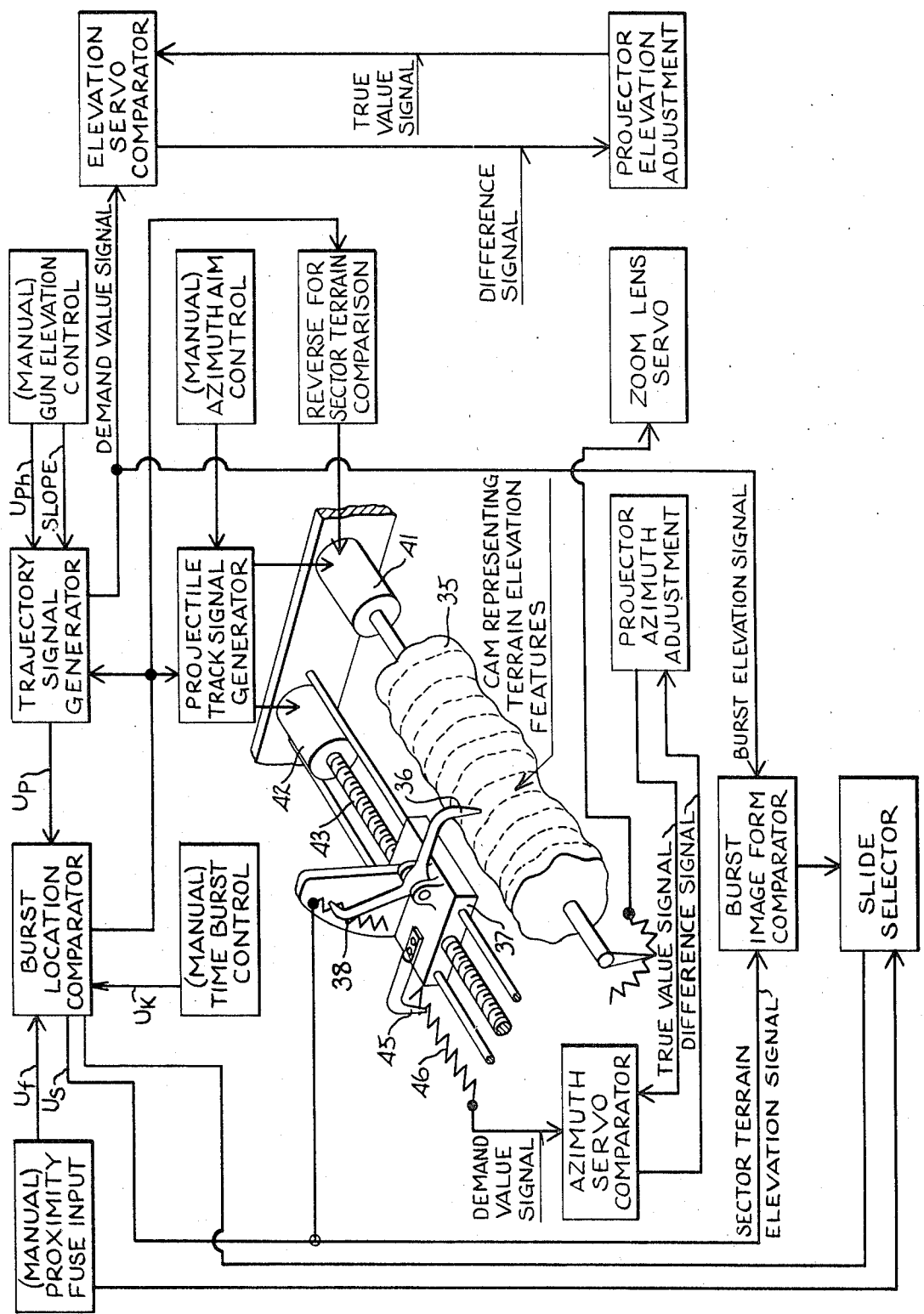
FIG. 7 is a block diagram of the control means for another embodiment of the apparatus of this invention, but with the memory unit and its associated signal producing means illustrated in diagrammatic perspective.

Obviously a series of axially adjacent cam segments secured to a common shaft for rotation therewith could be substituted for the tape in the embodiment just described. Each cam segment would then have its own feeler or sensor actuating a variable resistor, each such sensor being generally similar to the sensor 36 of FIG. 7 but mounted at a fixed location so that it always cooperates with the same cam segment.

There is always a certain amount of scattering of projectiles, even when they are fired from a gun maintained at constant elevation and azimuth angles, which scattering is due to unknown and uncontrollable ballistic and other factors. It is desirable to simulate such range and azimuth spread in a simulator, to further enhance its training value. To this end, the initial value $U_{ph}$ of the projectile trajectory signal $U_p$ can be randomly varied within certain limits. $U_k$ and azimuth component scatter can be simulated in a similar manner, as by feeding into and out of the projectile track signal generator a supplemental voltage that randomly varies within a small range.

Obviously the principles of the apparatus, as described above, can be employed to simulate the firing of a battery. For this a multiplicity of burst image projectors can be used, or a single projector 10 can be employed. In the latter case the burst location signals and burst image form signals for each gun assumed to comprise the battery are obtained individually and are stored in a memory unit, from which they are then released to the burst image projector in rapid succession.

From the foregoing description taken with the accompanying drawings it will be apparent that this invention provides a highly realistic but relatively inexpensive and completely safe training device for artillery fire controllers, capable of simulating very faithfully the effects of artillery fire commanded by fire controller trainees.

Those skilled in the art will appreciate that the invention can be embodied in forms other than as herein disclosed for purposes of illustration.

The invention is defined by the following claims:

1. Apparatus for simulating the results of firing an emplaced artillery piece, for use in training fire controllers, said apparatus comprising:
   (A) means defining an upright display area having thereon a representation of terrain as seen from a fire controller's post;
   (B) projection means comprising an element movable both laterally and vertically, for displaying at substantially any location on said display area an image simulating explosion of a projectile;
   (C) memory means providing a store of information concerning variations in elevation of the represented terrain along each of a plurality of laterally contiguous sectors which extend across the represented terrain and are defined by lines that radiate fanwise from the fire controller's post;
   (D) manually adjustable means for selecting a track across the represented terrain along which an assumed projectile is to move in the final portion of its trajectory;
   (E) means for producing a trajectory signal having a magnitude that corresponds to the changing altitude of said assumed projectile in the final portion of its trajectory;
   (F) signal means cooperable with the memory means for producing a terrain elevation signal having a magnitude comparable to said magnitude of the trajectory signal and which varies in correspondence with terrain elevations along the selected track of the assumed projectile;
   (G) means for comparing said magnitude of the trajectory and terrain elevation signals and for issuing an output when the difference between them attains a predetermined value;
   (H) azimuth servo means for adjusting the projection means laterally to project upon the point on the represented terrain that corresponds to the point on said track at which said output is issued; and
   (I) elevation servo means for adjusting the projection means in elevation for projection upon the represented terrain at an elevation that corresponds to the value of said magnitude of the trajectory signal at the instant said output is issued.

2. The apparatus of claim 1, further characterized by:
   (J) a plurality of slides cooperable with said projection means, each having an image of a projectile explosion, which images differ from one another with respect to the extent to which the imaged explosion is concealed by intervening terrain features;
   (K) signal responsive automatic means for selecting any one of said slides and for moving the selected slide into projection position with respect to the projection means;
   (L) means cooperable with the terrain elevation signal producing means and with the memory unit for producing a second terrain elevation signal corresponding to terrain elevations along the sector containing said point on the track, between said point and the fire controller's post; and
   (M) other comparator means connected with the means for producing said second terrain elevation signal and with the trajectory signal producing means, for comparing the highest value of said second terrain elevation signal with the value of the trajectory signal at the instant said output is produced, and for issuing a slide selection signal to said slide selector means.

3. The method of simulating firing results, for the training of artillery fire controllers, which method is characterized by:
   (A) displaying on a defined display area a two-dimensional representation of terrain as seen from a fire controller's post;
   (B) storing information corresponding to variations in elevation of the represented terrain along each of a plurality of laterally contiguous sectors of the represented terrain that are defined by imaginary lines radiating fanwise from a point corresponding to the fire controller's post;
   (C) for each set of aiming instructions delivered by a fire controller trainee, producing a trajectory signal having a magnitude which varies in correspondence with decreasing altitude of a projectile fired from a gun aimed in accordance with the instructions as said projectile crosses the represented terrain in the final portion of its trajectory;
   (D) by reference to said stored information producing a terrain elevation signal having said magnitude varying in correspondence with terrain elevations along the track across the represented terrain that is followed by said projectile;
   (E) constantly comparing the trajectory signal with the terrain elevation signal, and when the difference between their said magnitudes reaches a predetermined value, issuing a control signal;
   (F) by reference to said control signal, the trainee's aiming instructions and the value of the trajectory signal at the instant said output is issued, selecting a location on the terrain representation at which an explosion image will be displayed;
   (G) comparing said magnitude of the trajectory signal at said instant with the highest value of a second terrain elevation signal produced by reference to said stored information and which corresponds to terrain elevations along the sector containing said location, between said location and the fire controller's post; and
   (H) on the basis of the last mentioned comparison, selecting an appropriate explosion image for projection at said location.

4. The method of simulating the explosion of an artillery projectile upon an panorama that depicts an area of terrain having known variations in elevation when the projectile is assumed to be fired from a gun aimed in accordance with instructions issued by a fire controller trainee located at a predetermined point on said terrain, which method is characterized by:
   (A) producing a trajectory signal having a magnitude corresponding to the decreasing altitude of the projectile as it moves across the depicted terrain in the final portion of its trajectory;
   (B) producing a terrain elevation signal having a comparable magnitude which varies in correspondence with variations in elevation of the depicted terrain along the track of the projectile;
   (C) when the difference between said magnitudes of the terrain elevation signal and the trajectory signal reaches a predetermined value, issuing a control signal;
   (D) when the control signal is issued, orienting a projector
      (1) in azimuth in correspondence with the position in azimuth of the point along the projectile track at which the control signal is issued, and
      (2) in elevation in correspondence with said magnitude of the trajectory signal at the instant when the control signal is issued; and
   (E) when the projector is so oriented, projecting from it an image of an explosion.

5. The method of claim 4, further characterized by:
   (F) after issuance of the control signal, producing a second terrain elevation signal having a comparable magnitude which varies in correspondence with variations in elevation of the depicted terrain along a line connecting said point at which the controller's post is located with said point along the projectile track at which the control signal is issued;
   (G) comparing said magnitude of the trajectory signal at the instant the control signal is issued with the highest value of said magnitude of the second terrain elevation signal; and (H) on the basis of the last mentioned comparison, selecting an appropriate explosion image for projection.

6. In combination with a panorama depicting an area of terrain having known relative elevations, as such terrain would be seen from a point thereon that corresponds to the location of a fire controller's post, means for simulating upon the panorama the explosion of an artillery projectile fired from a gun aimed in accordance with instructions issued by a fire controller trainee as the same would appear from said point, the last named means comprising:

(A) a projector movable both in azimuth and in elevation relative to the panorama for projecting onto the panorama an image of an artillery projectile explosion;

(B) memory means providing a store of information concerning variations in elevation of the depicted terrain relative to the elevation of said point thereon;

(C) manually adjustable means for controlling the track of an imaginary projectile across the depicted terrain in accordance with the aim in azimuth of a gun from which the projectile is assumed to be fired;

(D) terrain elevation signal means cooperating with said manually adjustable means and with said memory means for producing a signal having a magnitude corresponding to variations in elevation of the depicted terrain along said track;

(E) trajectory signal means for producing a signal having a comparable magnitude that corresponds to the changing altitude of the imaginary projectile as it moves across the depicted terrain along said track;

(F) comparator means for comparing said magnitudes of the signals from the terrain elevation signal means and the trajectory signal means and for issuing an output when the difference between said magnitudes attains a predetermined value;

(G) azimuth servo means responsive to said output for adjusting the projector laterally to project to the azimuth position of the point on said track at which said output is issued; and (H) elevation servo means responsive to said output and to the signal from the trajectory signal means for adjusting the projector in elevation for projection upon the panorama at an elevation that corresponds to the magnitude of the signal from the trajectory signal means at the instant said output is issued.

References Cited
UNITED STATES PATENTS

| | | | |
|---|---|---|---|
| 2,418,512 | 4/1947 | Johnson | 35—25 |
| 2,662,305 | 12/1953 | Alric | 35—25 |

ROBERT W. MICHELL, Primary Examiner

J. H. WOLFF, Assistant Examiner